(12) United States Patent
Carvalho et al.

(10) Patent No.: US 11,392,943 B2
(45) Date of Patent: Jul. 19, 2022

(54) SYSTEM, METHOD, AND COMPUTER PROGRAM PRODUCT FOR AUTHENTICATING USER ACTIVITY BASED ON BIOMETRIC DATA

(71) Applicant: Visa International Service Association, San Francisco, CA (US)

(72) Inventors: Beatriz Montiani Carvalho, São Paulo (BR); Belkis Barral, Miami, FL (US); Rogerio Cazelato, Doral, FL (US); Gabriela Karina Castillo Sandoval, Mexico City (MX); Juan Carlos Amezcua, Bogota (CO)

(73) Assignee: Visa International Service Association, San Francisco, CA (US)

( * ) Notice: Subject to any disclaimer, the term of this patent is extended or adjusted under 35 U.S.C. 154(b) by 367 days.

(21) Appl. No.: 16/418,059

(22) Filed: May 21, 2019

(65) Prior Publication Data
US 2019/0354974 A1 Nov. 21, 2019

Related U.S. Application Data

(60) Provisional application No. 62/674,240, filed on May 21, 2018.

(51) Int. Cl.
*G06Q 40/00* (2012.01)
*G06Q 20/40* (2012.01)
*G06Q 30/00* (2012.01)

(52) U.S. Cl.
CPC ......... *G06Q 20/40* (2013.01); *G06Q 30/0185* (2013.01)

(58) Field of Classification Search
CPC ..... G06Q 40/00; G06Q 20/40; G06Q 30/0185
See application file for complete search history.

(56) References Cited

U.S. PATENT DOCUMENTS 9,047,604 B2 * 6/2015 Herder ............... G06Q 20/3674
2003/0065626 A1 4/2003 Allen
(Continued)

OTHER PUBLICATIONS

Current Fraud Management Techniques in Consumer Lending Collins, Michael E. Hoosier Banker; Indianapolis vol. 88, Iss. 12, (Dec. 2004): 27-30. (Year: 2004).*

*Primary Examiner* — Lalita M Hamilton
(74) *Attorney, Agent, or Firm* — The Webb Law Firm

(57) ABSTRACT

A computer-implemented method for authenticating user activity based on biometric data includes receiving a transaction request; determining that the transaction request is associated with a potentially fraudulent transaction; communicating a transaction response, the transaction response including instructions to resend the transaction request after a predetermined time period; before the predetermined time period elapses, communicating an identification confirmation request and receiving an identification confirmation response including biometric data from a computing device; after the predetermined time period elapses, receiving the resent transaction request; based on receiving the resent transaction request, determining an authorization decision based at least partially on the biometric data; and based on the resent transaction request, communicating a second transaction response including the authorization decision. A system and computer program product are also disclosed.

20 Claims, 6 Drawing Sheets

(56) References Cited

U.S. PATENT DOCUMENTS

| | | | |
|---|---|---|---|
| 2010/0038418 A1* | 2/2010 | Fomitchev | G06Q 40/02 |
| | | | 235/379 |
| 2012/0265681 A1 | 10/2012 | Ross | |
| 2012/0330765 A1* | 12/2012 | Fried | G06Q 20/4016 |
| | | | 705/18 |
| 2013/0232073 A1 | 9/2013 | Sheets et al. | |
| 2013/0290136 A1* | 10/2013 | Sheets | G06Q 30/0609 |
| | | | 705/26.35 |
| 2014/0162598 A1* | 6/2014 | Villa-Real | G06Q 20/363 |
| | | | 455/411 |
| 2014/0214673 A1 | 7/2014 | Baca et al. | |
| 2016/0291046 A1* | 10/2016 | Yabutani | G01N 35/0092 |
| 2017/0357981 A1 | 12/2017 | Azzam et al. | |
| 2018/0089688 A1 | 3/2018 | Kohli | |
| 2019/0095608 A1* | 3/2019 | Kohli | G06Q 20/40 |
| 2019/0108528 A1* | 4/2019 | Ramachandran | G06Q 20/405 |
| 2020/0403992 A1* | 12/2020 | Huffman | H04W 12/06 |
| 2021/0090078 A1* | 3/2021 | Bozicevich | G06Q 20/40 |

\* cited by examiner

SYSTEM, METHOD, AND COMPUTER PROGRAM PRODUCT FOR AUTHENTICATING USER ACTIVITY BASED ON BIOMETRIC DATA

CROSS REFERENCE TO RELATED APPLICATION

This application claims priority to U.S. Patent Application No. 62/674,240, filed May 21, 2018, which is incorporated herein by reference in its entirety.

BACKGROUND

1. Technical Field

The present disclosure relates generally to systems, devices, products, apparatus, and methods that are used for authentication using biometric data and, in embodiments to systems, products, and methods for authenticating user activity based on biometric data.

2. Technical Considerations

Payment transactions are commonly declined for the amount of the transaction exceeding a credit or funds limit and/or the issuer system suspecting that the transaction was fraudulently initiated.

While the transaction being declined may be advantageous in situations in which the transaction is fraudulently initiated, declining a non-fraudulently initiated transaction leads to several disadvantageous results. For example, a non-fraudulently initiated transaction being declined erodes consumer trust and confidence in the transaction service provider and issuer, and provides an overall negative user experience. In addition, processing resources may be increased in an attempt to verify a transaction. For example, a system (e.g., a system associated with transaction service provider and/or an issuer) may communicate a plurality of messages to a user to verify that a payment transaction is appropriate. Furthermore, the issuer, transaction service provider, user, and/or the merchant may lose the benefit of an otherwise legitimate transaction.

SUMMARY

Accordingly, systems, devices, products, apparatus, and/or methods for authenticating user activity, such as user payment transaction activity, are disclosed that overcome some or all of the deficiencies of the prior art.

According to non-limiting embodiments, provided is a computer-implemented method for authenticating user activity based on biometric data, the method comprising: receiving, with at least one processor, a transaction request comprising transaction data, wherein the transaction request is associated with a transaction initiated by a user; determining, with at least one processor, based on the transaction data, that the transaction request is associated with a potentially fraudulent transaction; communicating, with at least one processor, a transaction response, the transaction response including instructions to resend the transaction request after a predetermined time period; before the predetermined time period elapses, communicating, with at least one processor, an identification confirmation request to a computing device associated with the user; before the predetermined time period elapses, receiving, with at least one processor, an identification confirmation response comprising biometric data from the computing device associated with the user; after the predetermined time period elapses, receiving, with at least one processor, a resent transaction request; associating, with at least one processor, the resent transaction request with the transaction request; based on receiving the resent transaction request, determining, with at least one processor, an authorization decision based at least partially on the biometric data; and based on the resent transaction request, communicating, with at least one processor, a second transaction response comprising the authorization decision.

According to non-limiting embodiments, provided is a system for authenticating user activity based on biometric data, the system comprising: at least one processor programmed or configured to: receive a transaction request comprising transaction data, wherein the transaction request is associated with a transaction initiated by a user; determine, based on the transaction data, that the transaction request is associated with a potentially fraudulent transaction; communicate a transaction response, the transaction response including instructions to resend the transaction request after a predetermined time period; before the predetermined time period elapses, communicate an identification confirmation request to a computing device associated with the user; before the predetermined time period elapses, receive an identification confirmation response comprising biometric data from the computing device associated with the user; after the predetermined time period elapses, receive a resent transaction request; associate the resent transaction request with the transaction request; based on receiving the resent transaction request, determine an authorization decision based at least partially on the biometric data; and based on the resent transaction request, communicating, with at least one processor, a second transaction response comprising the authorization decision.

According to non-limiting embodiments, provided is a computer program product for authenticating user activity based on biometric data, the computer program product comprising at least one non-transitory computer-readable medium comprising one or more instructions that, when executed by at least one processor, cause the at least one processor to: receive a transaction request comprising transaction data, wherein the transaction request is associated with a transaction initiated by a user; determine, based on the transaction data, that the transaction request is associated with a potentially fraudulent transaction; communicate a transaction response, the transaction response including instructions to resend the transaction request after a predetermined time period; before the predetermined time period elapses, communicate an identification confirmation request to a computing device associated with the user; before the predetermined time period elapses, receive an identification confirmation response comprising biometric data from the computing device associated with the user; after the predetermined time period elapses, receive a resent transaction request; associate the resent transaction request with the transaction request; based on receiving the resent transaction request, determine an authorization decision based at least partially on the biometric data; and based on the resent transaction request, communicating, with at least one processor, a second transaction response comprising the authorization decision.

Further non-limiting aspects or embodiments are set forth in the following numbered clauses:

Clause 1: A computer-implemented method for authenticating user activity based on biometric data comprising: receiving, with at least one processor, a transaction request comprising transaction data, wherein the transaction request is associated with a transaction initiated by a user; determining, with at least one processor, and based on the transaction data, that the transaction request is associated with a potentially fraudulent transaction; communicating, with at least one processor, a transaction response, the transaction response including instructions to resend the transaction request after a predetermined time period; before the predetermined time period elapses, communicating, with at least one processor, an identification confirmation request to a computing device associated with the user; before the predetermined time period elapses, receiving, with at least one processor, an identification confirmation response comprising biometric data from the computing device associated with the user; after the predetermined time period elapses, receiving, with at least one processor, a resent transaction request; associating, with at least one processor, the resent transaction request with the transaction request; based on receiving the resent transaction request, determining, with at least one processor, an authorization decision based at least partially on the biometric data; and based on the resent transaction request, communicating, with at least one processor, a second transaction response comprising the authorization decision.

Clause 2: The computer-implemented method of clause 1, wherein the biometric data comprises at least one of: fingerprint data, voice recognition data, facial recognition data, or any combination thereof.

Clause 3: The computer-implemented method of clauses 1 or 2, wherein the identification confirmation response further comprises a fraud indicator response.

Clause 4: The computer-implemented method of any of clauses 1-3, comprising, based on the fraud indicator response indicating that the transaction is a fraudulent transaction, initiating a fraud response protocol.

Clause 5: The computer-implemented method any of clauses 1-4, comprising, based on the fraud indicator response indicating that the transaction is a fraudulent transaction, determining that the authorization decision is to decline the transaction.

Clause 6: The computer-implemented method of any of clauses 1-5, comprising, based on the fraud indicator response indicating that the transaction is not a fraudulent transaction, determining that the authorization decision is to approve the transaction.

Clause 7: The computer-implemented method of any of clauses 1-6, further comprising: based on receiving the identification confirmation response, comparing the biometric data to stored biometric data associated with the user; and determining whether the biometric data matches the stored biometric data.

Clause 8: The computer-implemented method of any of clauses 1-7, comprising, based on determining that the biometric data matches the stored biometric data, determining that the authorization decision is to approve the transaction.

Clause 9: The computer-implemented method of any of clauses 1-8, comprising, based on determining that the biometric data does not match the stored biometric data, determining that the authorization decision is to decline the transaction.

Clause 10: The computer-implemented method of any of clauses 1-9, wherein an issuer system communicates the identification confirmation request to the computing device associated with the user.

Clause 11: The computer-implemented method of any of clauses 1-10, further comprising: communicating, with at least one processor, a credit limit adjustment request to the computing device associated with the user, the credit limit adjustment request comprising a first credit limit associated with the user; receiving, with at least one processor, a credit limit adjustment response from the computing device associated with the user, the credit limit adjustment response comprising a second credit limit; and updating the first credit limit associated with the user to the second credit limit.

Clause 12: The computer-implemented method of any of clauses 1-11, wherein the credit limit adjustment request is communicated periodically.

Clause 13: The computer-implemented method of any of clauses 1-12, wherein the credit limit adjustment request is automatically communicated based on initiation of a transaction having an associated amount exceeding the first credit limit.

Clause 14: A system for authenticating user activity based on biometric data, the system comprising: at least one processor programmed or configured to: receive a transaction request comprising transaction data, wherein the transaction request is associated with a transaction initiated by a user; determine, based on the transaction data, that the transaction request is associated with a potentially fraudulent transaction; communicate a transaction response, the transaction response including instructions to resend the transaction request after a predetermined time period; before the predetermined time period elapses, communicate an identification confirmation request to a computing device associated with the user; before the predetermined time period elapses, receive an identification confirmation response comprising biometric data from the computing device associated with the user; after the predetermined time period elapses, receive a resent transaction request; associate the resent transaction request with the transaction request; based on receiving the resent transaction request, determine an authorization decision based at least partially on the biometric data; and based on the resent transaction request, communicating, with at least one processor, a second transaction response comprising the authorization decision.

Clause 15: The system of clause 14, wherein the biometric data comprises at least one of: fingerprint data, voice recognition data, facial recognition data, or any combination thereof.

Clause 16: The system of clauses 14 or 15, wherein the identification confirmation response further comprises a fraud indicator response.

Clause 17: The system of any of clauses 14-16, wherein the at least one processor is further programmed or configured to: based on the fraud indicator response indicating that the transaction is a fraudulent transaction, initiate a fraud response protocol.

Clause 18: The system of any of clauses 14-17, wherein the at least one processor is programmed or configured to: based on the fraud indicator response indicating that the transaction is a fraudulent transaction, determine that the authorization decision is to decline the transaction.

Clause 19: The system of any of clauses 14-18, wherein the at least one processor is programmed or configured to: based on the fraud indicator response indicating that the transaction is not a fraudulent transaction, determine that the authorization decision is to approve the transaction.

Clause 20: The system of any of clauses 14-19, wherein the at least one processor is further programmed or configured to: based on receiving the identification confirmation response, compare the biometric data to stored biometric data associated with the user; and determine whether the biometric data matches the stored biometric data.

Clause 21: The system of any of clauses 14-20, wherein the at least one processor is further programmed or configured to: based on determining that the biometric data matches the stored biometric data, determine that the authorization decision is to approve the transaction.

Clause 22: The system of any of clauses 14-21, wherein the at least one processor is further programmed or configured to: based on determining that the biometric data does not match the stored biometric data, determine that the authorization decision is to decline the transaction.

Clause 23: The system of any of clauses 14-22, wherein an issuer system communicates the identification confirmation request to the computing device associated with the user.

Clause 24: The system of any of clauses 14-23, wherein the at least one processor is further programmed or configured to: communicate a credit limit adjustment request to the computing device associated with the user, the credit limit adjustment request comprising a first credit limit associated with the user; receive a credit limit adjustment response from the computing device associated with the user, the credit limit adjustment response comprising a second credit limit; and update the first credit limit associated with the user to the second credit limit.

Clause 25: The system of any of clauses 14-24, wherein the credit limit adjustment request is communicated periodically.

Clause 26: The system of any of clauses 14-25, wherein the credit limit adjustment request is automatically communicated based on initiation of a transaction having an associated amount exceeding the first credit limit.

Clause 27: A computer program product for authenticating user activity based on biometric data, the computer program product comprising: at least one non-transitory computer-readable medium comprising one or more instructions that, when executed by at least one processor, cause the at least one processor to: receive a transaction request comprising transaction data, wherein the transaction request is associated with a transaction initiated by a user; determine, based on the transaction data, that the transaction request is associated with a potentially fraudulent transaction; communicate a transaction response, the transaction response including instructions to resend the transaction request after a predetermined time period; before the predetermined time period elapses, communicate an identification confirmation request to a computing device associated with the user; before the predetermined time period elapses, receive an identification confirmation response comprising biometric data from the computing device associated with the user; after the predetermined time period elapses, receive a resent transaction request; associate the resent transaction request with the transaction request; based on receiving the resent transaction request, determine an authorization decision based at least partially on the biometric data; and based on the resent transaction request, communicating, with at least one processor, a second transaction response comprising the authorization decision.

Clause 28: The computer program product of clause 27, wherein the biometric data comprises at least one of: fingerprint data, voice recognition data, facial recognition data, or any combination thereof.

Clause 29: The computer program product of clauses 27 or 28, wherein the identification confirmation response further comprises a fraud indicator response.

Clause 30: The computer program product of any of clauses 27-29, wherein the one or more instructions further cause the at least one processor to: based on the fraud indicator response indicating that the transaction is a fraudulent transaction, initiate a fraud response protocol.

Clause 31: The computer program product of any of clauses 27-30, wherein the one or more instructions further cause the at least one processor to: based on the fraud indicator response indicating that the transaction is a fraudulent transaction, determine that the authorization decision is to decline the transaction.

Clause 32: The computer program product of any of clauses 27-31, wherein the one or more instructions further cause the at least one processor to: based on the fraud indicator response indicating that the transaction is not a fraudulent transaction, determine that the authorization decision is to approve the transaction.

Clause 33: The computer program product of any of clauses 27-32, wherein the one or more instructions further cause the at least one processor to: based on receiving the identification confirmation response, compare the biometric data to stored biometric data associated with the user; and determine whether the biometric data matches the stored biometric data.

Clause 34: The computer program product of any of clauses 27-33, wherein the one or more instructions further cause the at least one processor to: based on determining that the biometric data matches the stored biometric data, determine that the authorization decision is to approve the transaction.

Clause 35: The computer program product of any of clauses 27-34, wherein the one or more instructions further cause the at least one processor to: based on determining that the biometric data does not match the stored biometric data, determine that the authorization decision is to decline the transaction.

Clause 36: The computer program product of any of clauses 27-35, wherein an issuer system communicates the identification confirmation request to the computing device associated with the user.

Clause 37: The computer program product of any of clauses 27-36, wherein the one or more instructions further cause the at least one processor to: communicate a credit limit adjustment request to the computing device associated with the user, the credit limit adjustment request comprising a first credit limit associated with the user; receive a credit limit adjustment response from the computing device associated with the user, the credit limit adjustment response comprising a second credit limit; and update the first credit limit associated with the user to the second credit limit.

Clause 38: The computer program product of any of clauses 27-37, wherein the credit limit adjustment request is communicated periodically.

Clause 39: The computer program product of any of clauses 27-38, wherein the credit limit adjustment request is automatically communicated based on initiation of a transaction having an associated amount exceeding the first credit limit.

These and other features and characteristics of the presently disclosed subject matter, as well as the methods of operation and functions of the related elements of structures and the combination of parts and economies of manufacture, will become more apparent based on the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
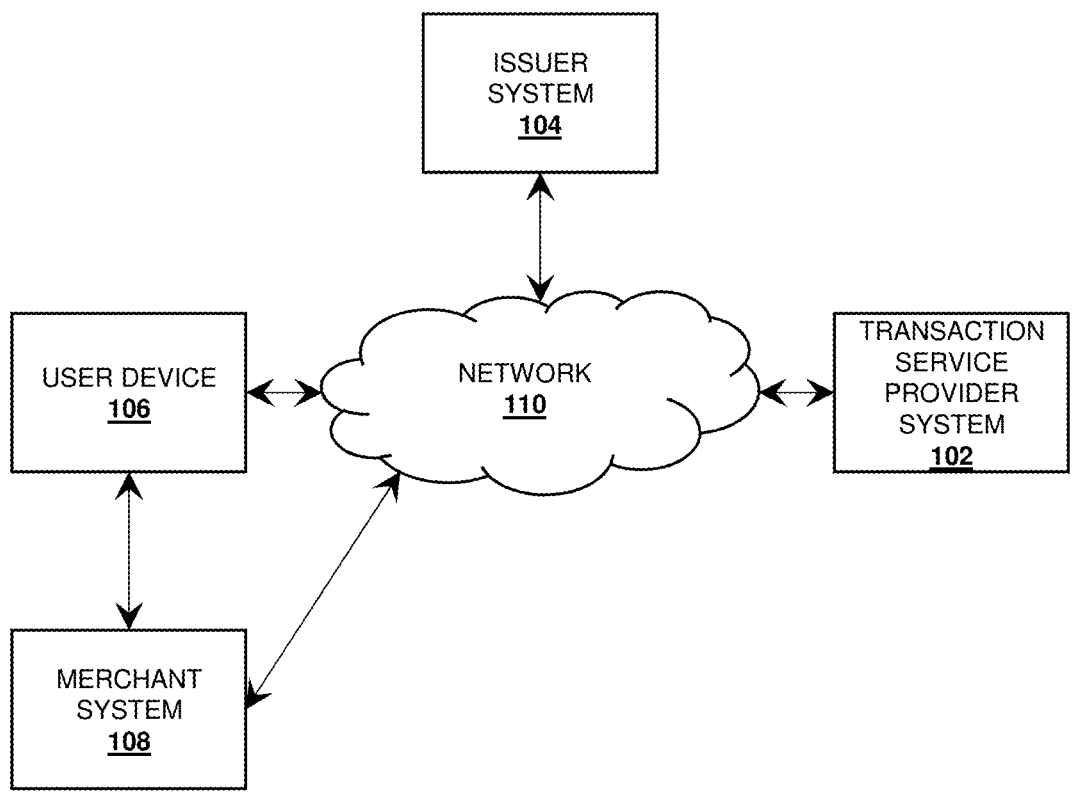
FIG. 1 is a diagram of a non-limiting embodiment of an environment in which systems, apparatuses, and/or methods, as described herein, may be implemented.

For purposes of the description hereinafter, the terms "end," "upper," "lower," "right," "left," "vertical," "horizontal," "top," "bottom," "lateral," "longitudinal," and derivatives thereof shall relate to the present disclosure as it is oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary embodiments of the present disclosure. Hence, specific dimensions and other physical characteristics related to the embodiments of the embodiments disclosed herein are not to be considered as limiting unless otherwise indicated.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "issuer institution" or "issuer" may refer to one or more entities, such as a bank, that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a payment device, such as a physical payment instrument (e.g., a payment card, a credit card, a debit card, and/or the like) and/or may be in electronic form and used for electronic payment transactions. The term "issuer system" refers to one or more computer systems operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "biometric input" or "biometric data" may refer to any type of biometric provided by a user such as, but not limited to, one or more of the following: a fingerprint, a retinal image, an iris image, a facial image, a hand geometry image, a verbal statement or response, a physiologic indicator, a DNA sample, a signature, and/or the like. The term "biometric input device," as used herein, may refer to one or more devices and/or systems for receiving and/or providing a biometric input, such as a computing device. As an example, a biometric input device may include one or more of the following: a fingerprint scanner, a retina and/or iris scanner, a camera, a microphone, a sensor, a touchscreen, and/or the like.

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. In other non-limiting embodiments, the computing device may be a desktop computer or other non-mobile computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen etc.).

As used herein, the term "card present transaction" may refer to a payment transaction initiated with a payment device in which the cardholder physically presents the payment device for a merchant's visual examination at the time the payment transaction is initiated with the payment device. A non-limiting example of a card present transaction is a payment transaction initiated at a brick-and-mortar retail store with physical POS systems, during which the cardholder physically presents the payment device to the merchant.

As used herein, the term "card not present transaction" or "CNP transaction" may refer to a payment transaction initiated with a payment device in which the cardholder does not or cannot physically present the payment device for a merchant's visual examination at the time the payment transaction is initiated with the payment device. Non-limiting examples of CNP transactions include mail-order transactions initiated by mail or facsimile or a payment transaction initiated over the telephone or the internet.

The term "account data," as used herein, refers to any data concerning one or more accounts for one or more users. Account data may include, for example, one or more account identifiers, user identifiers, transaction histories, balances, credit limits, issuer institution identifiers, and/or the like.

Non-limiting embodiments of the present disclosure are directed to a method, system, and computer program product for authenticating user activity based on biometric data. The user activity may include user-initiated payment transactions, such that the present disclosure allows for the user to authenticate that the user was the individual initiating a payment transaction suspected by the issuer system of being a fraudulent payment transaction. The present disclosure allows for fraudulent payment transactions to be identified so that the payment transaction may be declined and a fraud protocol initiated to protect the user's account. Further, the present disclosure provides the user an opportunity to confirm that the transaction suspected of being fraudulent is actually a non-fraudulent transaction. This allows for false declines to be avoided. The present disclosure utilizes biometric data of the user to confirm that a payment transaction is non-fraudulent, and this biometric data may include fingerprint data, voice recognition data, and/or facial recognition data. Using biometric data to authentic a user ensures that the individual confirming the non-fraudulent nature of the transaction is the correct user, as biometric data is unique to each user and difficult to replicate by an identity thief. The present disclosure further allows for the user to adjust a credit limit associated with the account, keeping the account current and reducing the number of declined transaction based on the credit limit being exceeded.

Referring to FIG. 1, FIG. 1 is a diagram of an example environment 100 in which devices, systems, and/or methods, described herein, may be implemented. In some non-limiting embodiments, devices, systems, and/or methods disclosed herein may be used for authenticating user activity based on biometric data is shown. The user activity may include a payment transaction initiated by a user (e.g., a consumer) with a merchant, but it will be appreciated that the system described herein may apply to other user activities (e.g. various requests initiated remotely by a user that may be fraudulently initiated). As shown in FIG. 1, environment 100 includes transaction service provider system 102, issuer system 104, user device 106, merchant system 108, and network 110. Transaction service provider system 102, issuer system 104, user device 106, and/or merchant system 108 may interconnect (e.g., establish a connection to communicate) via wired connections, wireless connections, or a combination of wired and wireless connections Transaction service provider system 102 may include one or more devices capable of being in communication with issuer system 104, user device 106, and/or merchant system 108 via network 110. For example, transaction service provider system 102 may include a computing device, such as a server (e.g., a transaction processing server), a group of servers, and/or other like devices. In some non-limiting embodiments, transaction service provider system 102 may be associated with a transaction service provider as described herein. In some non-limiting embodiments, transaction service provider system 102 may be in communication with a data storage device, which may be local or remote to transaction service provider system 102. In some non-limiting embodiments, transaction service provider system 102 may be capable of receiving information from, storing information in, communicating information to, or searching information stored in a data storage device.

Issuer system 104 may include one or more devices capable of being in communication with transaction service provider system 102, user device 106, and/or merchant system 108 via network 110. For example, issuer system 104 may include one or more computing devices, such as a server, a group of servers, and/or other like devices. In some non-limiting embodiments, issuer system 104 may be associated with an issuer as described herein. For example, issuer system 104 may be associated with an issuer that issued an account (e.g., a credit account, debit account, credit card, debit card, and/or the like) to a user associated with user device 106.

User device 106 may include one or more devices capable of being in communication with transaction service provider system 102, issuer system 104, and/or merchant system 108 via network 110. For example, user device 106 may include one or more computing devices, such as one or more portable computers, one or more tablet computers, one or more cellular phones, one or more smartphones, one or more wearable devices (e.g., watches, glasses, lenses, clothing, and/or the like), one or more PDAs, and/or the like. In some non-limiting embodiments, user device 106 may or may not be capable of receiving information (e.g., from merchant system 108) via a short-range wireless communication connection (e.g., a near-field communication (NFC) communication connection, an radio frequency identification (RFID) communication connection, a Bluetooth® communication connection, and/or the like) and/or communicating information (e.g., to merchant system 108) via a short range wireless communication connection.

Merchant system 108 may include one or more devices capable of being in communication with transaction service provider system 102, issuer system 104, and/or user device 106 via network 110. For example, merchant system 108 may include one or more computing devices, such as one or more servers, one or more client devices, one or more point-of-sale (POS) devices, and/or other like devices. In some non-limiting embodiments, merchant system 108 may include a device capable of receiving information from user device 106 via a network (e.g., network 110) and/or a wireless communication connection (e.g., an NFC communication connection, an RFID communication connection, a Bluetooth® communication connection, and/or the like) with user device 106, and/or communicating information to user device 106 via the network and/or the communication connection. In some non-limiting embodiments, merchant system 108 may be associated with a merchant as described herein. In some non-limiting embodiments, merchant system 108 may include one or more user devices 106. For example, merchant system 108 may include user device 106 that allows a merchant to communicate information to transaction service provider system 102. In some non-limiting embodiments, merchant system 108 may include one or more devices, such as computers, computer systems, and/or peripheral devices capable of being used by a merchant to conduct a payment transaction with a user. For example, merchant system 108 may include a POS device and/or a POS system.

Network 110 may include one or more wired and/or wireless networks. For example, network 110 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks shown in FIG. 1 are provided as an example. There may be additional systems, devices, and/or networks, fewer systems, devices and/or networks, different systems, devices and/or networks, or differently arranged systems, devices and/or networks than those shown in FIG. 1. Furthermore, two or more devices or systems shown in FIG. 1 may be implemented within a single device or system, or a single device or system shown in FIG. 1 may be implemented as multiple, distributed devices or systems. Additionally, or alternatively, a set of devices or systems (e.g., a plurality of devices or systems) of environment 100 may perform one or more functions described as being performed by another set of devices or systems of environment 100.

Figure 2:
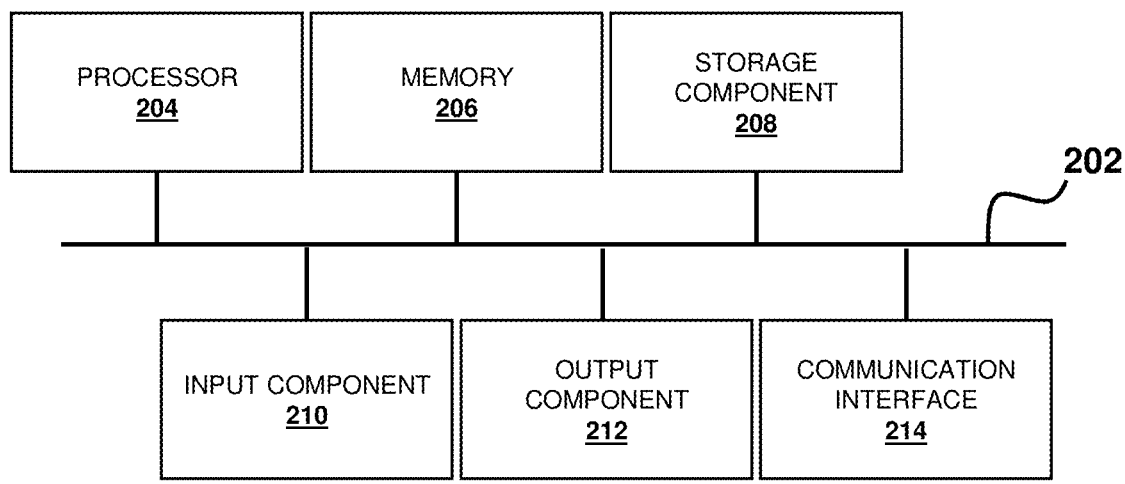
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of transaction service provider system 102, and/or one or more devices of issuer system 104, user device 106, and/or one or more devices of merchant system 108. In some non-limiting embodiments, transaction service provider system 102, issuer system 104, user device 106, and/or merchant system 108 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

In some non-limiting embodiments, user device 106 may be used to initiate a payment transaction, or the payment transaction may be initiated by a user physically presenting their payment device to the merchant at a brick-and-mortar location of the merchant. In this way, the payment transaction may be a card present transaction or a card not present transaction. The payment transaction may be a transaction initiated over the Internet. In some non-limiting embodiments, one or more user devices 106 may be associated with the user.

In some non-limiting embodiments, user device 106 may communicate with a merchant system 108 to initiate a payment transaction using a payment device. The payment transaction may include an exchange of goods and/or services from the merchant for a monetary amount from the user. Merchant system 108 may include a point-of-sale device. Merchant system 108 may be operated by or on behalf of the merchant.

In some non-limiting embodiments, merchant system 108 may communicate a transaction request to a transaction service provider system 102 operated by or on behalf of a transaction service provider. The transaction service provider may be the transaction service provider associated with the payment device used to initiate the payment transaction. The transaction request may be a message to request that the transaction service provider and the issuer of the payment device process the payment transaction to completion (e.g., authorize, clear, and settle the payment transaction).

The transaction request may include relevant transaction data. The transaction data may include any data relevant to processing the payment transaction. The transaction data may include account data, such as the personal account number (PAN), expiration data, and card verification number (e.g., card verification value (CVV) code) of the payment device. The transaction data may include personal and/or contact information of the user associated with the payment device, such as billing address, shipping address, social security number, legal name, and the like. The transaction data may include data associated with the merchant, such as a unique merchant identifier, merchant bank identification number (BIN), merchant address, merchant legal name, merchant category code, and the like. The transaction data may include data associated with the payment transaction, such as data associated with goods purchased (e.g., universal product codes (UPCs), amount of goods purchased, and the like). The transaction data may include data associated with the ISO-defined data elements for ISO 8583. The list of transaction data provided herein is only intended to be exemplary, and other transaction data required to process payment transactions is considered within the scope of the present disclosure.

In some non-limiting embodiments, transaction service provider system 102 may communicate a transaction request to an issuer system 104 operated by or on behalf of the issuer of the payment device used to initiate the payment transaction. The transaction request communicated from transaction service provider system 102 to issuer system 104 may include all or a subset of the transaction data communicated by merchant system 108 to the transaction service provider system 102. Transaction service provider system 102 may determine the relevant issuer system 104 to which the transaction request is to be communicated. Transaction service provider system 102 may add additional transaction data to the transaction request before the transaction request is communicated to issuer system 104.

In some non-limiting embodiments, issuer system 104 may receive the transaction request from transaction service provider system 102. In response, issuer system 104 may determine whether to authorize the payment transaction. The authorization decision may include to approve the payment transaction, to decline the payment transaction, or to determine whether the payment transaction is fraudulent. If issuer system 104 determines that the payment transaction may have been fraudulently initiated, the authorization decision may be to determine whether the payment transaction is fraudulent.

In some non-limiting embodiments, to determine whether the payment transaction is fraudulent, issuer system 104 may communicate a transaction response to transaction service provider system 102, and the transaction response may include instructions for the transaction request to be resent after a predetermined time period. The predetermined time period may be any sufficient time period for issuer system 104 to communicate with user device 106 of the user and receive a response therefrom regarding whether the payment transaction is fraudulent. In some non-limiting examples, the predetermined time period may be at least 30 seconds, such as at least 1 minute, at least 2 minutes, at least 5 minutes, at least 10 minutes, at least 15 minutes, at least 30 minutes, or at least 1 hour. In some non-limiting embodiments, transaction service provider system 102 may communicate the transaction response (e.g., in whole or in part) to merchant system 108, which instructs merchant system 108 to resend the transaction request after the predetermined time period.

In some non-limiting embodiments, before the predetermined time period elapses and after the transaction response is sent, issuer system 104 may communicate an identification confirmation request to user device 106 of the user. In some non-limiting embodiments, the identification confirmation request may be a form of communication that is suitable for communicating with the user via user device 106 (e.g., a text message, an email, and/or a telephone call). For example, the identification confirmation request may be in the form of a push message.

In some non-limiting embodiments, before the predetermined time period elapses and based on receiving the identification confirmation request, user device 106 may communicate an identification confirmation response to issuer system 104. The identification confirmation response may include a fraud indicator response. The fraud indicator response may indicate whether the transaction was fraudulently initiated (e.g., initiated by a user unknown to the user) or non-fraudulently initiated (e.g., initiated by the user). The fraud indicator response may be a binary result communicated to issuer system 104 (e.g., a yes/no answer as to whether the payment transaction is fraudulent). In such an example, user device 106 may receive input from the user as the user selects a response to the identification confirmation request (e.g., the yes/no answer as to whether the payment transaction is fraudulent) using any suitable method.

In some non-limiting embodiments, based on the fraud indicator response indicating the payment transaction is fraudulent, issuer system 104 may initiate a fraud response protocol. The fraud response protocol may include initiating an investigation into potential identify theft of account data associated with the payment device. The fraud response protocol may include communicating with the user to notify the user of potential fraud. The fraud response protocol may include automatically deactivating the payment device (preventing further transactions from being initiated therewith) until the fraud investigation is complete. Other fraud response activity may be included in the fraud response protocol.

In some non-limiting embodiments, based on the fraud indicator response indicating that the transaction is fraudulent, issuer system 104 may determine that the authorization decision is to decline the payment transaction. In some non-limiting embodiments, based on the fraud indicator response indicating that the transaction is not fraudulent, issuer system 104 may determine based at least partially on the fraud indicator response that the authorization decision is to approve the payment transaction.

The identification confirmation response may also include biometric data. The biometric data may include fingerprint data, voice recognition data, and/or facial recognition data entered into user device 106 by the user. Other forms of biometric data (e.g., retina scanners and the like) may additionally or alternatively be used. The user may select which type(s) of biometric data to communicate in the identification confirmation response, or the biometric data communicated may be determined by the technology available using user device 106.

The fingerprint data may be communicated by the user pressing a finger against a predetermined portion of user device 106 or by any other existing method of transferring fingerprint data using a user device 106. The voice recognition data may be communicated by the user reciting a predetermined word or phrase during a predetermined time period or by any other existing method of transferring voice recognition data using a user device 106. The facial recognition data may be communicated by the user taking a self-portrait photograph (a "selfie") during a predetermined time period using user device 106 or by any other existing method of transferring facial recognition data using a user device 106. The biometric data communicated may be biometric data inputted by the user into user device 106 after the identification confirmation request is received to ensure that previous biometric data is not being used and the user entering the data is the same user whose biometric data is being inputted.

In some non-limiting embodiments, based on receiving the identification confirmation response with the biometric data, issuer system 104 (or a system in communication therewith) may compare the biometric data with stored biometric data associated with the user. The stored biometric data may be stored on a database associated with issuer system 104 and/or user device 106, and the stored biometric data may include biometric data associated with the user that was previously communicated to issuer system 104 by the user or taken by the user on user device 106. In some non-limiting embodiments, the stored biometric data may have been communicated by user device 106 of the user to the issuer system at a previous time, such as during set-up of the user account. In some non-limiting embodiments, issuer system 104 may determine whether the biometric data (received in the identification confirmation response) matches the stored biometric data, which may indicate whether the user communicating the identification confirmation response is the user associated with user device 106. In some non-limiting embodiments, user device 106 (instead of or in addition to issuer system 104) may determine whether the biometric data matches the stored biometric data and may communicate to issuer system 104 biometric data identifying whether the biometric data matches the stored biometric data.

In some non-limiting embodiments, after the predetermined time period elapses, issuer system 104 may receive a resent transaction request (from merchant system 108 and/or transaction service provider system 102). In some non-limiting embodiments, the resent transaction request may include a message requesting that the payment transaction be processed (an authorization decision be made). Based on receiving the resent transaction request, issuer system 104 may associate the resent transaction request with the initial transaction request. In some non-limiting embodiments, issuer system 104 may determine the authorization decision based at least partially on the biometric data from the identification confirmation response.

In some non-limiting embodiments, based on determining that the biometric data from the identification confirmation response matches the stored biometric data, issuer system 104 may determine that the authorization decision is to approve the payment transaction. In some non-limiting embodiments, based on determining that the biometric data from the identification confirmation response does not match the stored biometric data, issuer system 104 may determine that the authorization decision is to decline the payment transaction. In some non-limiting embodiments, if the biometric data does not match the stored biometric data, the issuer system may initiate the fraud response protocol (previously described). Additionally or alternatively, issuer system 104 may determine that the authorization decision is to approve the payment transaction if the biometric data matches the stored biometric data and the fraud indicator response indicates that the payment transaction is not fraudulent.

In some non-limiting embodiments, based on the resent transaction request, issuer system 104 may communicate a second transaction response to transaction service provider system 102, and the second transaction response may include the authorization decision. In some non-limiting embodiments, transaction service provider system 102 may communicate the authorization decision to merchant system 108.

In some non-limiting embodiments, issuer system 104 may communicate a credit limit adjustment request to user device 106 associated with the user. The credit limit adjustment request may identify a first credit and/or funds limit (hereinafter "credit limit") associated with an account of the user (such as a credit limit of an account of a user associated with a payment device). The first credit limit may represent the credit limit presently associated with the relevant user account.

In some non-limiting embodiments, user device 106 may, based on receiving a credit limit adjustment request, communicate a credit limit adjustment response to issuer system 104, and the credit limit adjustment response may include a second credit limit, which represents a credit limit selected by the user to be associated with the user account. In some non-limiting embodiments, issuer system 104 may update the first credit limit with the second credit limit such that the present credit limit of the user account is updated to the user selected second credit limit. The second credit limit may be the same or different than the first credit limit. Entry of biometric data may be required as described herein to ensure the correct user is updating the credit limit.

In some non-limiting embodiments, the user may use user device 106 to specify the second credit limit. For example, the user may type in the second credit limit to user device 106. In another example, the user may select the second credit limit from several options provided in the credit limit adjustment request. In another example, the user may slide a cursor along a selection bar to identify the second credit limit. In some non-limiting embodiments, issuer system 104 may limit the available second credit limits selectable by the user.

In some non-limiting embodiments, the credit limit adjustment request may be communicated to user device 106 of the user periodically, such as daily, weekly, monthly, quarterly, yearly, and the like. In some non-limiting embodiments, the credit limit adjustment request may be communicated to user device 106 of the user based on initiation of a payment transaction that includes a transaction amount that exceeds the first credit limit if a higher credit limit is available to the user. This may prevent a payment transaction from being declined based on a lack of available credit.

In some non-limiting embodiments, user device 106 may include a GUI associated with a system for authenticating user activity based on biometric data. In some non-limiting embodiments, the GUI may be operated by transaction service provider system 102, issuer system 104, and/or merchant system 108. In some non-limiting embodiments, the GUI may display a push notification received by user device 106 from issuer system 104. The push notification may include an identification confirmation request and indicates that a potentially fraudulent transaction has been initiated and that biometric data is required to confirm that the payment transaction is non-fraudulent. In some non-limiting embodiments, the GUI may allow the user to select the type of biometric data to be entered to send with the identification confirmation response. The user may select any of the types of biometric data (e.g., fingerprint data, voice recognition data, facial recognition data), and multiple types of biometric data may be included in the identification confirmation response to confirm that the payment transaction is non-fraudulent.

Figure 3A:
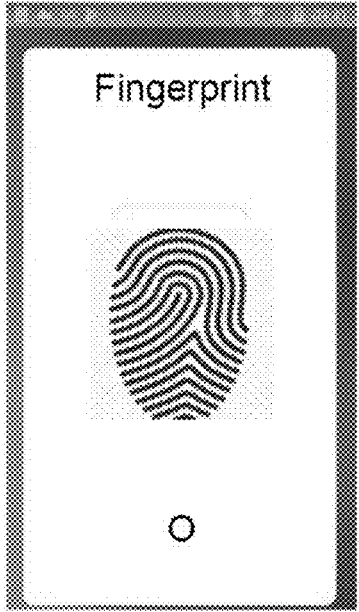
FIGS. 3A-3C show graphical user interfaces (GUIs) associated with various methods for a user to enter biometric data to confirm user activity.
Figure 3B:
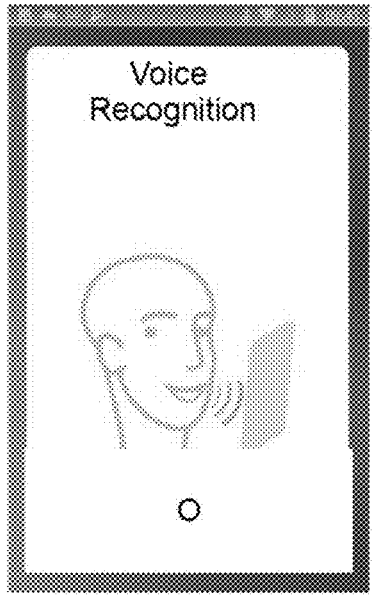
Figure 3C:
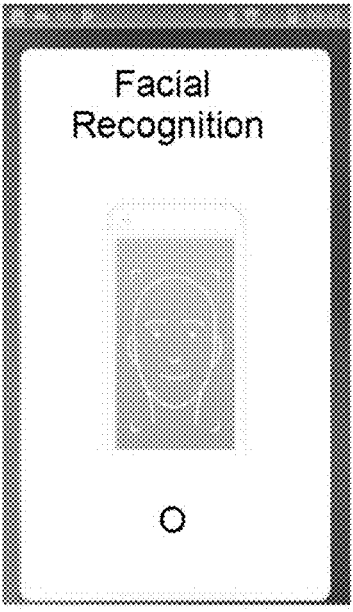

Referring to FIGS. 3A-3C, example GUIs 300A-300C are shown for collecting biometric data (fingerprint data, voice recognition data, and facial recognition data, respectively). These GUIs are non-limiting examples, and it will be appreciated that other biometric data and other methods of collecting the relevant biometric data may be used.

Referring to FIG. 3A, a GUI 300A for collecting fingerprint data is shown. The user may press their finger to a predefined portion of user device 106 so that a fingerprint reading may be taken. For example, the user may press their finger against the button on the bottom center of user device 106 to take the fingerprint reading. User device 106 may communicate data associated with that fingerprint reading to issuer system 104 in the identification confirmation response as the biometric data. Capabilities of user device 106 may dictate how the fingerprint reading is taken and how the fingerprint data is communicated.

Referring to FIG. 3B, a GUI 300B for collecting voice recognition data is shown. The user may press the microphone button on the touchscreen of user device 106 and repeat a predefined phrase so that the voice recognition data may be taken. In some non-limiting examples, the user may say any word or phrase, as opposed to a predefined word or phrase. User device 106 may communicate the voice recognition data (e.g., in whole or in part) to issuer system 104 in the identification confirmation response. Capabilities of user device 106 may dictate how the voice recognition data is collected and how the voice recognition data is communicated.

Referring to FIG. 3C, a GUI 300C for collecting facial recognition data is shown. User device 106 may capture an image of a user (e.g., an image of a face of a user, a selfie, and/or the like) associated with user device 106 so that user device 106 receives and/or stores the required facial recognition data. User device 106 may communicate the facial recognition data (e.g., in whole or in part) to issuer system 104 in the identification confirmation response. Capabilities of user device 106 may dictate how the facial recognition data is collected and how the facial recognition data is communicated.

Figure 4:
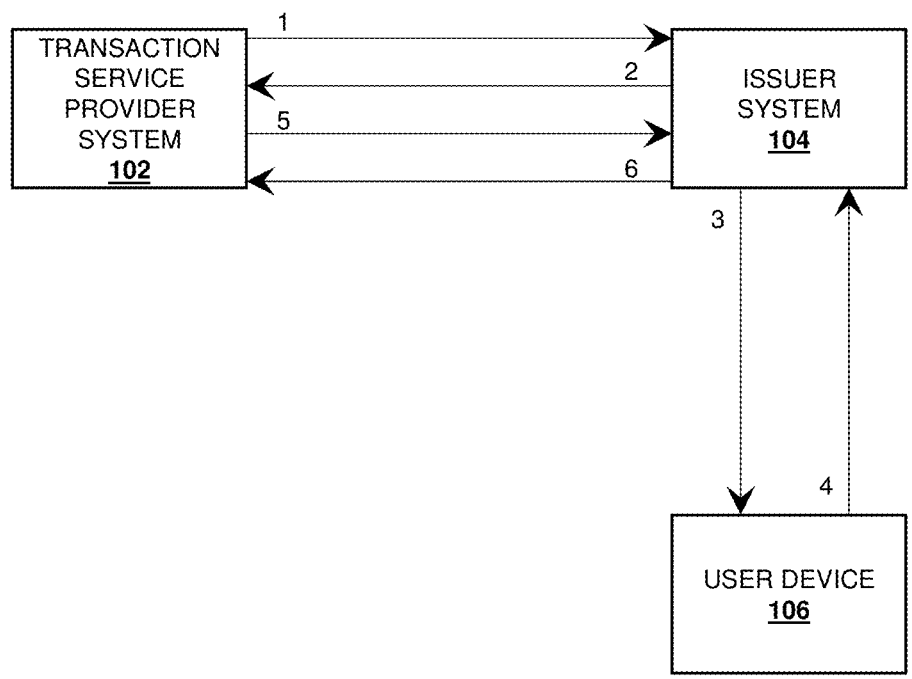
FIG. 4 shows a schematic diagram of a system for authenticating user activity based on biometric data.

Referring to FIG. 4, FIG. 4 shows a non-limiting embodiment of a system 400 for authenticating user activity based on biometric data. As shown in FIG. 4, system 400 includes transaction service provider system 102, issuer system 104, and user device 106. In some non-limiting embodiments, in a first communication, transaction service provider system 102 may communicate a transaction request (e.g., an initial transaction request) to issuer system 104. Based on determining that the payment transaction associated with the transaction request is potentially fraudulent, issuer system 104 may communicate a second communication to transaction service provider system 102, the communication including the transaction response, the transaction response including instructions to resend the transaction request after a predetermined time period.

In some non-limiting embodiments, after the second communication but before a fifth communication, issuer system 104 may communicate a third communication to user device 106. The third communication may include the identification confirmation request. In some non-limiting embodiments, before the fifth communication (or after the fifth communication in certain examples), user device 106 may communicate a fourth communication to issuer system 104, and the fourth communication may include the identification confirmation response including the biometric data.

In some non-limiting embodiments, the fifth communication may include a communication from transaction service provider system 102 to issuer system 104, and the fifth communication may include the resent transaction request associated with the initial transaction request (sent after the predetermined time period). In some non-limiting embodiments, issuer system 104 may communicate a sixth communication based on receiving the fifth communication, and the sixth communication may include the second transaction response including the authorization decision.

Figure 5:
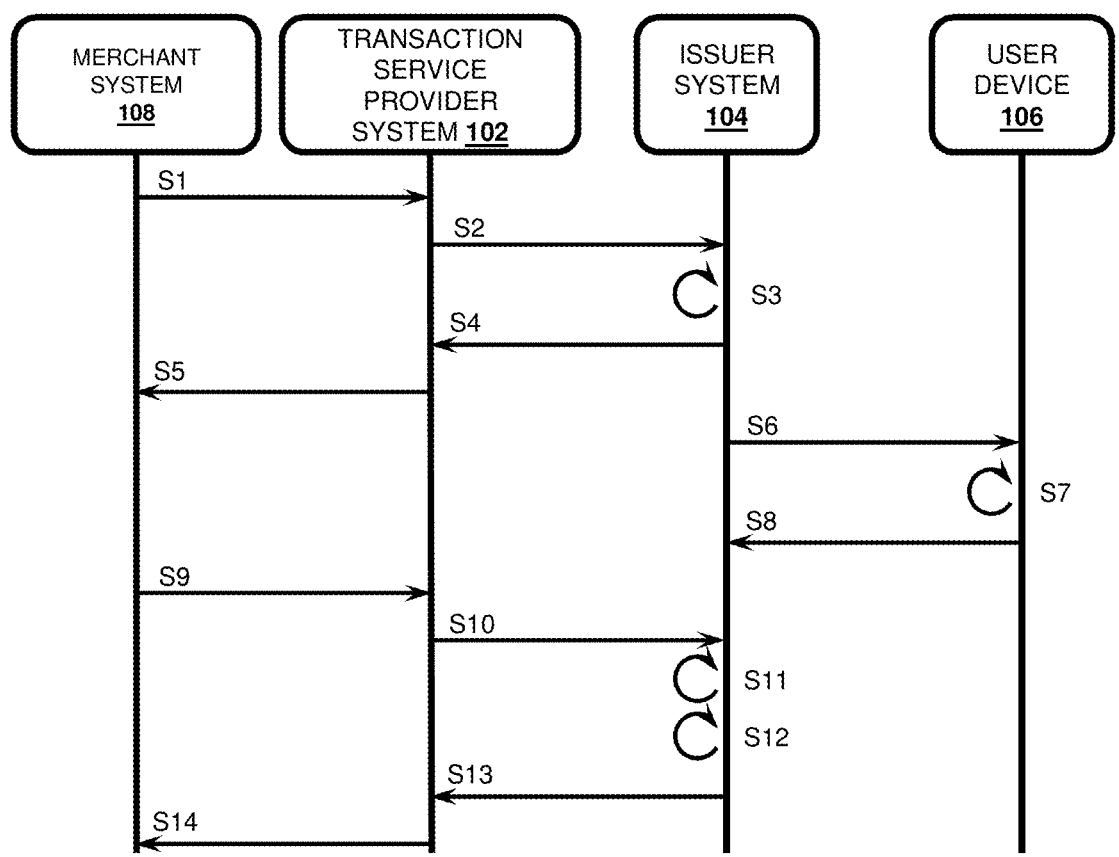
FIG. 5 shows a process flow diagram of a method for authenticating user activity based on biometric data.

Referring to FIG. 5, a non-limiting embodiment of a method 500 for authenticating user activity based on biometric data is shown. At a first step (S1), merchant system 108 may communicate a transaction request for a payment transaction including the previously described transaction data. At a second step (S2), transaction service provider system 102 may communicate the transaction request to issuer system 104. In some non-limiting embodiments, the transaction request from transaction service provider system 102 to issuer system 104 may include at least some of the transaction data from the transaction request communicated by merchant system 108 to transaction service provider system 102. In some non-limiting embodiments, transaction service provider system 102 may communicate the transaction request to the relevant issuer system 104 (e.g., issuer system 104 associated with the issuer of the payment device initiating the payment transaction).

As further shown in FIG. 5, at a third step (S3), issuer system 104 may determine that the payment transaction is a potentially fraudulent payment transaction. At a fourth step (S4), issuer system 104 may communicate a transaction response with instructions to resend the transaction request after a predetermined time period to transaction service provider system 102. At a fifth step (S5), transaction service provider system 102 may communicate the transaction response to merchant system 108.

As further shown in FIG. 5, after communicating the transaction response and before the time period elapses, at a sixth step (S6), issuer system 104 may communicate the identification confirmation request to the user device 106. At a seventh step (S7), based on receiving the identification confirmation request, the user device 106 may collect the biometric data from the user. At an eighth step (S8), before the time period elapses, user device 106 may communicate the identification confirmation response to issuer system 104, the identification confirmation response including the biometric data.

As further shown in FIG. 5, after the predetermined time period elapses, merchant system 108 may communicate the resent transaction request to transaction service provider system 102 at a ninth step (S9). At a tenth step (S10), transaction service provider system 102 may communicate the resent transaction request to issuer system 104. At an eleventh step (S11), based on receiving the resent transaction request, issuer system 104 may associate the resent transaction request with the initial transaction request. At a twelfth step (S12), issuer system 104 may determine the authorization decision based at least partially on the biometric data from the identification confirmation response.

As further shown in FIG. 5, based on the resent transaction request, at a thirteenth step (S13), issuer system 104 may communicate a second transaction response including the authorization decision to transaction service provider system 102. At a fourteenth step (S14), transaction service provider system 102 may communicate that transaction response with the authorization decision to merchant system 108.

Figure 6:
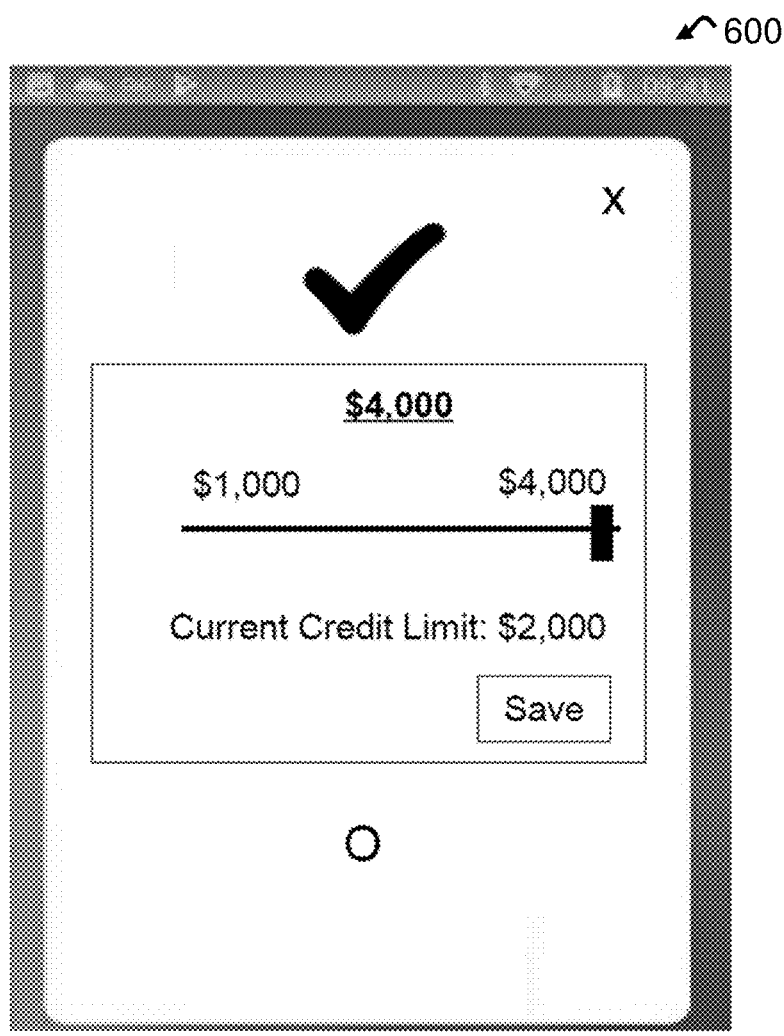
FIG. 6 shows a GUI that allows a user to adjust a credit limit.

Referring to FIG. 6, FIG. 6 shows a GUI 600 that allows a user to adjust a credit limit according to some non-limiting embodiments. In some non-limiting embodiments, the GUI 600 shows the credit limit adjustment request sent from issuer system 104 to user device 106. In some non-limiting embodiments, the credit limit adjustment request identifies the current credit limit associated with the user account being $2,000 (the first credit limit). Issuer system 104 may determine a range of credit limits available to the user and allow the user to determine which credit limit to associate with the account. For example, issuer system 104 allows the user to select a credit limit from $1,000-$4,000, and this is represented by the slideable bar at the center of the GUI 600. The user may slide the slideable bar on the GUI 600 displayed on user device 106 within the credit limit range. As shown in FIG. 6, the slideable bar is shown such that the credit limit selected is $4,000 (the highest available credit limit). In some non-limiting embodiments, a user may initiate a save function for the credit limit on user device 106, which causes user device 106 to communicate the credit limit adjustment response to issuer system 104. In some non-limiting embodiments, issuer system 104 may then update the first credit limit ($2,000) to the user selected second credit limit ($4,000).

In some non-limiting embodiments, the capability of the user to authenticate user activity (e.g., a payment transaction) or update a credit limit as described herein may be available through an online portal or a mobile application on a smartphone and may be available to users who have enrolled in an authentication program. In some non-limiting embodiments, the user may create a user account to enroll in the relevant program. In some non-limiting embodiments, the user may identify various account information (PAN numbers and other account data, personal and contact information, and the like) to enroll the various accounts (e.g., payment devices) in the program.

In some non-limiting embodiments, when enrolling in the program, the user may enter account information, later used to authenticate user activity and/or update the credit limit. For example, the user may identify at least one computer device to associate with the user's account, such that the program recognizes user devices commonly used by the user as a device (e.g., a computing device) associated with the user. Additionally or alternatively, the user may add information regarding certain wireless networks commonly used by the user. The user may also enter biometric data to user device 106, which may be communicated to transaction service provider system 102, issuer system 104, and/or merchant system 108, which may include the (previously described) stored biometric data. A device associated with the user that is used to communicate data (e.g., user device 106), a wireless network associated with the user, and/or a biometric data associated with the user may be considered "trusted", such that if the device associated with the user, the wireless network associated with the user, and/or the biometric data associated with the user is recognized as trusted, the user may be identified and/or authenticated.

In some non-limiting embodiments, when enrolling in the authentication program, the user may identify merchant information that provides the program with information about which merchants the user commonly shops. The user may upload a payment transaction history and/or the transaction history may be retrieved by the authentication program, so that the authentication program can identify shopping habits of the user. Analyzing user transaction history may allow the authentication program to determine whether a transaction may be fraudulent.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements. For example, it is to be understood that the present disclosure contemplates that, to the extent possible, one or more aspects of any embodiment can be combined with one or more aspects of any other embodiment.

What is claimed is:

1. A computer-implemented method for authenticating user activity based on biometric data comprising:
    receiving, with at least one processor, an initial transaction request comprising transaction data, wherein the initial transaction request is associated with a transaction initiated by a user;
    determining, with at least one processor and based on the transaction data, that the initial transaction request is associated with a potentially fraudulent transaction;
    communicating, with at least one processor, a transaction response, the transaction response including instructions to resend the initial transaction request after a predetermined time period;
    after communicating the transaction response and before the predetermined time period elapses, communicating, with at least one processor, an identification confirmation request to a computing device associated with the user;
    before the predetermined time period elapses, receiving, with at least one processor, an identification confirmation response comprising biometric data from the computing device associated with the user;
    after the predetermined time period elapses, receiving, with at least one processor, a resent transaction request, wherein the resent transaction request comprises a transaction request that is communicated after the predetermined time period and in response to the transaction response, wherein the resent transaction request comprises the transaction data of the initial transaction request;
    associating, with at least one processor, the resent transaction request with the initial transaction request;
    based on receiving the resent transaction request, determining, with at least one processor, an authorization decision based at least partially on the biometric data; and
    based on the resent transaction request, communicating, with at least one processor, a second transaction response comprising the authorization decision.

2. The computer-implemented method of claim 1, wherein the biometric data comprises at least one of:
    fingerprint data,
    voice recognition data,
    facial recognition data, or
    any combination thereof.

3. The computer-implemented method of claim 1, wherein the identification confirmation response further comprises a fraud indicator response.

4. The computer-implemented method of claim 3, comprising, based on the fraud indicator response indicating that the transaction is a fraudulent transaction, initiating a fraud response protocol.

5. The computer-implemented method of claim 3, comprising, based on the fraud indicator response indicating that the transaction is a fraudulent transaction, determining that the authorization decision is to decline the transaction.

6. The computer-implemented method of claim 3, comprising, based on the fraud indicator response indicating that the transaction is not a fraudulent transaction, determining that the authorization decision is to approve the transaction.

7. The computer-implemented method of claim 1, further comprising:
    based on receiving the identification confirmation response, comparing the biometric data to stored biometric data associated with the user; and
    determining whether the biometric data matches the stored biometric data.

8. A system for authenticating user activity based on biometric data, the system comprising:
    at least one processor programmed or configured to:
        receive an initial transaction request comprising transaction data, wherein the initial transaction request is associated with a transaction initiated by a user;
        determine, based on the transaction data, that the initial transaction request is associated with a potentially fraudulent transaction;
        communicate a transaction response, the transaction response including instructions to resend the initial transaction request after a predetermined time period;
        after communicating the transaction response and before the predetermined time period elapses, communicate an identification confirmation request to a computing device associated with the user;
        before the predetermined time period elapses, receive an identification confirmation response comprising biometric data from the computing device associated with the user;
        after the predetermined time period elapses, receive a resent transaction request, wherein the resent transaction request comprises a transaction request that is communicated after the predetermined time period and in response to the transaction response, wherein the resent transaction request comprises the transaction data of the initial transaction request;
        associate the resent transaction request with the initial transaction request;
        based on receiving the resent transaction request, determine an authorization decision based at least partially on the biometric data; and
        based on the resent transaction request, communicating, with at least one processor, a second transaction response comprising the authorization decision.

9. The system of claim 8, wherein the at least one processor is further programmed or configured to:
    based on receiving the identification confirmation response, compare the biometric data to stored biometric data associated with the user; and determine whether the biometric data matches the stored biometric data.

10. The system of claim 9, wherein the at least one processor is further programmed or configured to:
based on determining that the biometric data matches the stored biometric data, determine that the authorization decision is to approve the transaction.

11. The system of claim 9, wherein the at least one processor is further programmed or configured to:
based on determining that the biometric data does not match the stored biometric data, determine that the authorization decision is to decline the transaction.

12. The system of claim 8, wherein an issuer system communicates the identification confirmation request to the computing device associated with the user.

13. The system of claim 8, wherein the at least one processor is further programmed or configured to:
communicate a credit limit adjustment request to the computing device associated with the user, the credit limit adjustment request comprising a first credit limit associated with the user;
receive a credit limit adjustment response from the computing device associated with the user, the credit limit adjustment response comprising a second credit limit; and
update the first credit limit associated with the user to the second credit limit.

14. The system of claim 13, wherein the credit limit adjustment request is communicated periodically.

15. The system of claim 13, wherein the credit limit adjustment request is automatically communicated based on initiation of a transaction having an associated amount exceeding the first credit limit.

16. A computer program product for authenticating user activity based on biometric data, the computer program product comprising at least one non-transitory computer-readable medium comprising one or more instructions that, when executed by at least one processor, cause the at least one processor to:
receive an initial transaction request comprising transaction data, wherein the initial transaction request is associated with a transaction initiated by a user;
determine, based on the transaction data, that the initial transaction request is associated with a potentially fraudulent transaction;
communicate a transaction response, the transaction response including instructions to resend the initial transaction request after a predetermined time period;
after communicating the transaction response and before the predetermined time period elapses, communicate an identification confirmation request to a computing device associated with the user;
before the predetermined time period elapses, receive an identification confirmation response comprising biometric data from the computing device associated with the user;
after the predetermined time period elapses, receive a resent transaction request, wherein the resent transaction request comprises a transaction request that is communicated after the predetermined time period and in response to the transaction response, wherein the resent transaction request comprises the transaction data of the initial transaction request;
associate the resent transaction request with the initial transaction request;
based on receiving the resent transaction request, determine an authorization decision based at least partially on the biometric data; and
based on the resent transaction request, communicating, with at least one processor, a second transaction response comprising the authorization decision.

17. The computer program product of claim 16, wherein the biometric data comprises at least one of:
fingerprint data,
voice recognition data,
facial recognition data, or
any combination thereof.

18. The computer program product of claim 16, wherein the identification confirmation response further comprises a fraud indicator response.

19. The computer program product of claim 18, wherein the one or more instructions further cause the at least one processor to:
based on the fraud indicator response indicating that the transaction is a fraudulent transaction, initiate a fraud response protocol.

20. The computer program product of claim 18, wherein the one or more instructions further cause the at least one processor to:
based on the fraud indicator response indicating that the transaction is a fraudulent transaction, determine that the authorization decision is to decline the transaction.

* * * * *